(12) United States Patent
Zacarias et al.

(10) Patent No.: US 8,768,834 B2
(45) Date of Patent: Jul. 1, 2014

(54) DIGITAL EXCHANGE AND MOBILE WALLET FOR DIGITAL CURRENCY

(71) Applicant: Plastic Jungle, Inc., San Mateo, CA (US)

(72) Inventors: Arturo M. Zacarias, San Jose, CA (US); Ashmit Bhattacharya, Pleasanton, CA (US); Bruce Bower, Menlo Park, CA (US); Steve Grove, San Jose, CA (US)

(73) Assignee: e2interactive, Inc., Atlanta, GA (US)

( * ) Notice: Subject to any disclaimer, the term of this patent is extended or adjusted under 35 U.S.C. 154(b) by 0 days.

(21) Appl. No.: 13/623,787

(22) Filed: Sep. 20, 2012

(65) Prior Publication Data

US 2013/0073459 A1    Mar. 21, 2013

Related U.S. Application Data

(60) Provisional application No. 61/536,881, filed on Sep. 20, 2011, provisional application No. 61/551,815, filed on Oct. 26, 2011, provisional application No. 61/645,014, filed on May 9, 2012.

(51) Int. Cl.
*G06Q 40/00* (2012.01)
*G06Q 20/36* (2012.01)
*G06Q 30/08* (2012.01)

(52) U.S. Cl.
CPC .............. *G06Q 20/36* (2013.01); *G06Q 30/08* (2013.01)
USPC .......................................................... 705/41

(58) Field of Classification Search
USPC .......................................................... 705/41
See application file for complete search history.

(56) References Cited

U.S. PATENT DOCUMENTS

| | | |
|---|---|---|
| 7,243,082 B1 | 7/2007 | Forlai |
| 7,494,048 B2 | 2/2009 | Gusler et al. |
| 7,953,654 B2 | 5/2011 | Abifaker |
| 2004/0205138 A1 | 10/2004 | Friedman et al. |
| 2005/0171902 A1* | 8/2005 | Nguyen .................... 705/39 |
| 2007/0045403 A1 | 3/2007 | Slonecker |
| 2007/0205269 A1 | 9/2007 | Lindon |
| 2007/0272736 A1 | 11/2007 | Brooks et al. |
| 2008/0091540 A1 | 4/2008 | Blagg et al. |

(Continued)

OTHER PUBLICATIONS

Anonymous; "ViVOtech; IDA Showcase Mobile NFC Through ViVOtech's Technology"; China Weekly News; Jul. 5, 2011.*

(Continued)

*Primary Examiner* — Edward Chang
(74) *Attorney, Agent, or Firm* — Landmark Intellectual Property Law, PC

(57) ABSTRACT

Techniques are provided for managing a digital wallet on behalf of a user. A user causes one or more value-ascertainable items (such as gift cards) to be reflected in the user's digital wallet. Once a value-ascertainable item is reflected in the digital wallet, the user may access the digital wallet and use the value-ascertainable item to make a purchase from a merchant that is capable of redeeming the value-ascertainable item. Alternatively, an exchange service that maintains the digital wallet allows the user to exchange the value-ascertainable item for another value-ascertainable item, whether of the same type item or a different type of item. The exchanged-for item may be used to make a purchase from a merchant that is capable of redeeming the exchanged-for item.

25 Claims, 12 Drawing Sheets

(56) References Cited

U.S. PATENT DOCUMENTS

| | | |
|---|---|---|
| 2008/0162271 A1 | 7/2008 | Benjamin |
| 2008/0270224 A1* | 10/2008 | Portman et al. ............ 705/10 |
| 2009/0063530 A1 | 3/2009 | Lee et al. |
| 2009/0106112 A1 | 4/2009 | Dalmia et al. |
| 2009/0210318 A1 | 8/2009 | Abifaker |
| 2009/0265269 A1 | 10/2009 | Stoecker |
| 2010/0036524 A1 | 2/2010 | Chirco |
| 2010/0200653 A1 | 8/2010 | Wolfe et al. |
| 2010/0280896 A1 | 11/2010 | Postrel |
| 2010/0280911 A1 | 11/2010 | Roberts et al. |
| 2011/0112919 A1 | 5/2011 | Gray |
| 2011/0137740 A1* | 6/2011 | Bhattacharya et al. ........ 705/17 |
| 2011/0276437 A1 | 11/2011 | Mullen et al. |
| 2011/0288922 A1 | 11/2011 | Thomas et al. |
| 2011/0295744 A1 | 12/2011 | Wisniewski et al. |
| 2012/0072298 A1 | 3/2012 | Ramanujam et al. |
| 2012/0150731 A1 | 6/2012 | Isaacson et al. |
| 2013/0073459 A1 | 3/2013 | Zacarias et al. |

OTHER PUBLICATIONS

Sposito, Sean; "Mobile GPS-Based Rewards Get Poor Reception at SmartyPig"; Amiercan Banker; Mar. 30, 2012.*

"Notification of Transmittal of the International Search Report and the Written Opinion of the International Searching Authority, or the Declaration", received in International application No. PCT/US2013/035984 dated Jul. 25, 2013 (12 pages).

Current Claims of International application No. PCT/US2013/035984 dated Jul. 2013 (3 pages).

* cited by examiner

DIGITAL EXCHANGE AND MOBILE WALLET FOR DIGITAL CURRENCY

CROSS-REFERENCE TO RELATED APPLICATIONS

This application claims the benefit of priority from: (1) U.S. Provisional Application No. 61/536,881 filed Sep. 20, 2011, entitled "DIGITAL EXCHANGE AND MOBILE WALLET FOR DIGITAL CURRENCY"; (2) U.S. Provisional Application No. 61/551,815 filed Oct. 26, 2011, entitled "DIGITAL EXCHANGE AND MOBILE WALLET FOR DIGITAL CURRENCY"; and (3) U.S. Provisional Application No. 61/645,014 filed May 9, 2012, entitled "USING A CLOSED-LOOP STORED-VALUE INSTRUMENT AT A THIRD PARTY MERCHANT"; the entire contents of each of which is incorporated by this reference for all purposes as if fully disclosed herein.

This application is related to (1) U.S. application Ser. No. 12/903,987 filed Oct. 13, 2010, entitled "PROCESSING VALUE-ASCERTAINABLE ITEMS"; and (2) U.S. application Ser. No. 13/295,753 filed Nov. 14, 2011; the entire contents of each of which is incorporated by this reference for all purposes as if fully disclosed herein.

FIELD OF THE INVENTION

Techniques are provided that relate to allowing a user to accumulate information about value-ascertainable items (such as gift cards) in a digital wallet that the user can access from a mobile device. More specifically, techniques are provided that relate to allowing the user to purchase additional value-ascertainable items to be added to the digital wallet, exchange value-ascertainable items in the digital wallet for other value-ascertainable items, or redeem value-ascertainable items in the digital wallet.

BACKGROUND

Common types of financial instruments include credit cards, debit cards, and stored-value instruments. A stored-value instrument is a financial instrument, usually structured as a means for payment, in which funds are associated with the instrument and not necessarily associated with any individual. Gift and pre-paid cards are a common form of stored-value instrument. Gift cards in particular have become extremely popular in recent years. Gift cards essentially relieve the donor of the burden of selecting a specific and individually appropriate gift for the recipient, instead allowing the recipient to choose, from the range of products sold by the issuer, the actual goods or services s/he wishes upon redemption. Most gift cards resemble credit cards in size and composition, although increasingly gift cards are becoming virtualized for delivery and redemption across digital networks. Gift cards also tend to display a specific theme that corresponds to the issuer of the card. Although gift cards are typically identified by a specific number or code, gift cards are typically not associated with an individual name or account. Thus, gifts cards can be used by anybody. In order to support gift cards, an issuer of gift cards maintains (directly or indirectly) an on-line electronic system for authorization and accounting of gift cards issued by the issuer. Some gift cards can be "reloaded" with additional monetary value. Thus, the funds associated with such gift cards can be depleted and replenished multiple times.

One disadvantage of gift cards over other forms of payment is that many gift cards have an expiration date, which may vary between a few months to a few years. If the holder of a gift card does not use the gift card before the expiration date, then the issuer of the gift card may deplete or completely eliminate the associated credit from the associated card. Alternatively, due to laws in some states, the funds represented by the gift card may be claimed as "lost property" by the state in which the issuer resides or where the purchase of the gift card took place.

Another disadvantage of gift cards is that gift cards can only be used to make purchases from merchants designated by the issuers of the gift cards. Typically, the issuers of the gift cards only designate themselves. For example, a Company X's gift card can only be used at Company X's store (whether online or in a "brick and mortar" store). The Company X's gift card cannot be used to purchase items from Company Y because Company Y does not recognize Company X's gift card as valid payment. Further, Company Y is incapable of removing any balance from Company X's gift card. In this way, gift cards are considered "closed-loop" stored-value instruments. With respect to Company X's gift card, Company Y is said to be "outside of the loop." A closed-loop stored-value instrument (or simply "closed-loop instrument") is typically sold by an individual retailer, serviced by the retailer (or its agents), and is accepted for purchases only at that particular retailer's locations. Another characteristic of a closed-loop instrument is that such an instrument is issued by an entity and liability is incurred by the same entity. For example, a merchant (such as Company X) issues a gift card with a positive balance and, upon issuance, incurs liability to offer goods or services in exchange for the monetary value reflected by the balance on the gift card. The gift card may only be used to purchase goods or services from that particular merchant.

Yet another disadvantage of a gift card is that, because it may be used only for goods or services offered by the issuer, a gift card recipient may not be able to fully utilize the card and put it to its best use. For example, the recipient of the gift card may not wish to purchase any of the goods or services offered by the issuer, or may have more of a need to purchase goods or services from another merchant. Or there may not be a store location convenient to the recipient, making use of the card inconvenient. In these instances, the recipient may prefer to receive the market value for the card in cash or may prefer to deploy the market value of the card against a purchase at another merchant, rather than have the card either expire or simply go unused.

In some situations, a holding company may own multiple merchants, and allow its gift cards to be used at any of the merchants that it owns. However, even in this situation, the issuing entity and the entity that incurs the liability are the same. Consequently, even though one of the gift cards issued by the holding company may be labeled with one of its merchants and used to purchase an item from another of its merchants, such gift cards are still closed-loop instruments. With respect to gift cards issued by the holding company, the multiple merchants owned by the holding company are considered to be "inside the loop."

In contrast, an "open-loop" instrument is an instrument that is issued by a bank or other financial institution that has a banking license. A banking license requires its holder to comply with general banking regulations to which issuers of closed-loop instruments need not comply. Open-loop instruments, unlike closed-loop instruments, also may operate over debit or credit networks, carry a network logo (e.g., Visa®), and can be used at any retail location that accepts the payment form. Common open-loop instruments include debit cards that are issued by banks and credit cards that are issued by Visa®, MasterCard®, American Express® or Discover®. When a customer with an open-loop instrument completes a purchase from a merchant using the open-loop instrument, the customer incurs liability to pay the issuing bank while the issuer of the open-loop instrument authorizes and settles against the liability.

Some instruments may be considered "semi-open" in that they may be accepted by a limited number of different merchants. An example of such an instrument is a "mall card" that is accepted by multiple (or all) merchants in a particular mall. Another example of such an instrument is a "university card" that is accepted by multiple (or all) merchants located on or around a particular university's campus. These "semi-open" instruments are considered closed-loop because the issuer is not a financial institution that is required to have a banking license and the merchants that accept the instruments are limited to those designated by the issuer of the instrument.

Based on the foregoing, what is needed is a way for a gift card holder to maximize the value of a gift card while being able to avoid some of its drawbacks.

DETAILED DESCRIPTION

Figure 1:
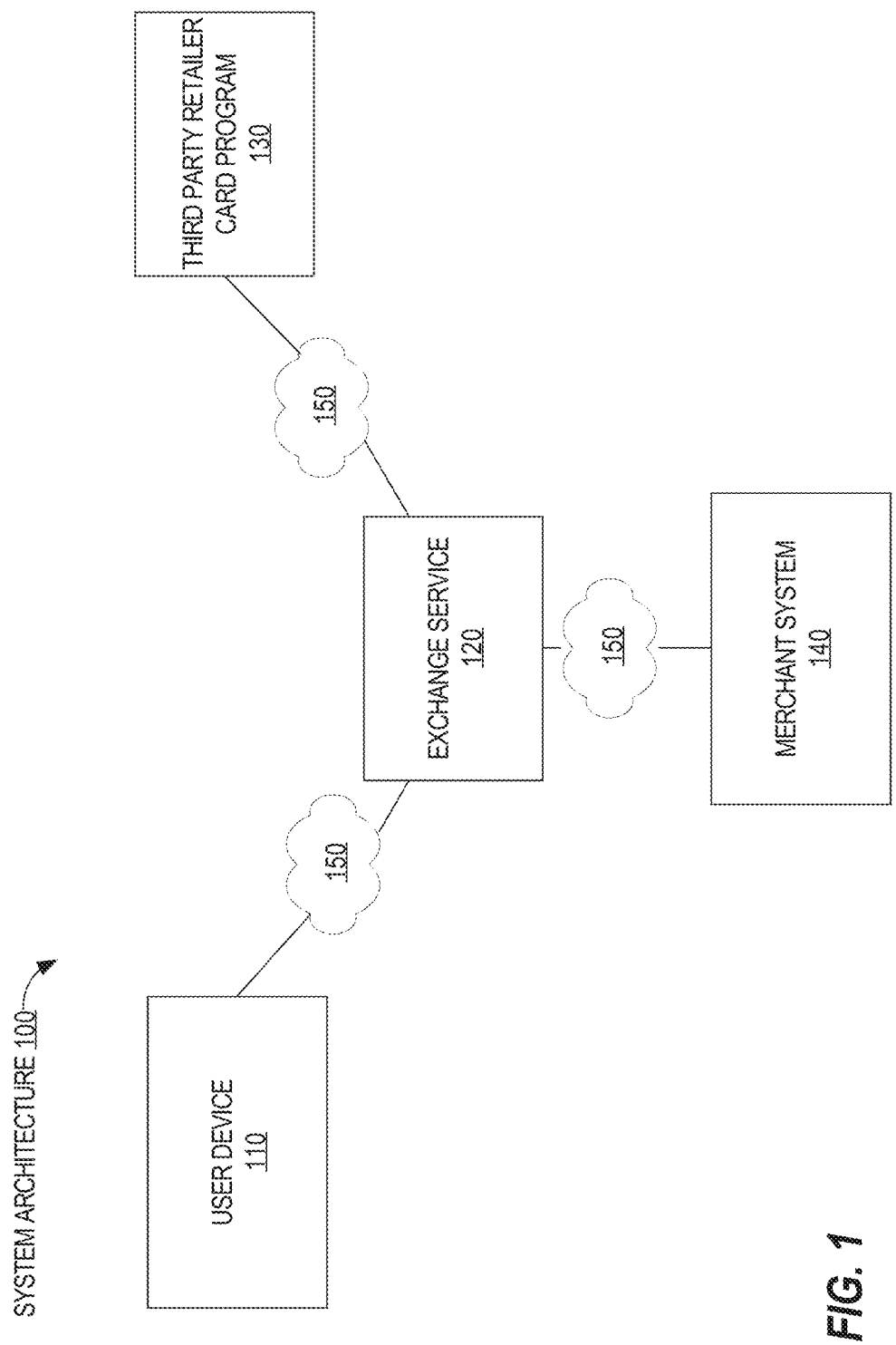
FIG. 1 is a block diagram that depicts an example system architecture that supports the use of a gift card (or other value-ascertainable item) to purchase one or more items from a merchant that is "outside of the loop" with respect to the gift card, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Extending Liquidity to Value-Ascertainable Items

The Internet has enabled the development of markets in select goods that have only been supported thus far by in-person, physical trade. Several techniques are described herein for extending the liquidity created by such markets into a payment means of tender. Although many examples that shall be given hereafter are in the context of closed-loop stored-value instruments (such as gift cards), the techniques described herein may be applied to any items whose values are reasonably ascertainable by an entity without the entity having the items present. Such items are referred to herein as "value-ascertainable items."

A closed-loop stored-value instrument (such as a gift card) is merely one example of a value-ascertainable item. Other examples include baseball cards, rare coins, gems, comic books, points from a loyalty or rewards program, pre-paid cards, post-paid cards, smart cards, merchandized credit, lay-aways, virtual currencies, airline miles, residual insurance values, etc. A rewards program is a marketing effort that rewards and, thus encourages, loyal buying behavior, which is beneficial to the company that runs the program. For example, a retail establishment might issue loyalty or rewards cards (although not necessary) to customers who can use the cards as identification when dealing with that retailer. By presenting the card (or otherwise presenting a rewards account number), a customer may be entitled to a discount or an allotment of points that can be used for future purchases. As used herein, "value-ascertainable item" does not include traditional forms of payment, such as cash, credit cards, and debit cards.

Virtually any item may be a value-ascertainable item as long as there is an authoritative source for ascertaining the value of the item without the item itself being present. The authoritative source may be a recognized "pricing guide" for a particular type of item, or may be empirically derived. For example, the average selling price of identical items in an online auction system may be established as the authoritative source for the value of an item.

Applying the techniques described hereafter to value-ascertainable items, a mobile phone may be used as payment to purchase concert tickets and vice versa, as long as the value of the mobile phone and the value of the concert tickets may be ascertained to a reasonable degree of accuracy. As another example, if the value of a set of music CDs and an item of clothing may be ascertained, then that set of CDs may be used as payment to purchase the item of clothing, and vice versa.

In an embodiment, a value-ascertainable exchange service (or VAES) (such as exchange service 120 depicted in FIG. 1, that shall be described hereafter) hosts a website where a user (e.g., using a web browser) searches for an item and requests to pay for the item using a second item as payment. In response, the VAES determines the value of the second item from an authoritative source. The VAES then determines an offer for the second item based on the value that the authoritative source provided for the second item. As shall be explained in greater detail hereafter in the context of closed-loop stored-value instruments, the offer value may be greater than, the same, or less than the determined value of the second item. Typically, however, the offer value will be less than the determined value of the second item. Additionally or alternatively, the VAES allows users to (1) trade in their value-ascertainable items for cash and (2) purchase the value-ascertainable items from the VAES.

General Overview

In an embodiment, digital wallets are maintained by an exchange service on behalf of multiple users. A digital wallet for a particular user includes information about one or more value-ascertainable items. A value-ascertainable item identified in a user's digital wallet may be an item that the user acquired and then uploaded item identification information to the user's digital wallet.

A particular value-ascertainable item identified in a user's digital wallet may be a value-ascertainable item that the user acquired from the exchange service. The user may have exchanged, through the exchange service, another value-ascertainable item for the particular value-ascertainable item or may have purchased the particular value-ascertainable item from the exchange service. Thus, a user's digital wallet may be very dynamic.

A user may access his/her digital wallet from any type of device using a web browser or a dedicated application. At any time, the user may use digital currency reflected in the user's digital wallet to purchase one or more goods or services from a merchant, regardless of whether the source of that digital currency (e.g., a gift card) was issued by the merchant. The digital wallet also has the benefit that the user is not required to carry plastic cards or other physical media that stores account information that are associated with current balances. Exchange service 120 allows gift cards and other types of value-ascertainable items to be used as payment at virtually any merchant. Thus, value-ascertainable items such as closed-loop stored-value instruments may be used as if they were open-loop instruments, similar to credit cards and debit cards. Exchange service 120 thus effectively turns value-ascertainable items into a form of digital currency that can be used almost anywhere.

While the systems and techniques described herein may be applied to all forms of value-ascertainable items, examples are provided herein where the value-ascertainable items corresponds to gift cards and reward or loyalty points. However, the systems and techniques described herein are not limited to the context of gift cards or reward/loyalty points. Also, while the systems and techniques described in the context of browsers and mobile technology, embodiments are relevant across any networked technology.

System Architecture

FIG. 1 is a block diagram that depicts an example system architecture 100 that supports the use of a gift card (or other value-ascertainable item) as payment to purchase one or more items from a merchant that is "outside of the loop" with respect to the gift card, according to an embodiment of the invention. FIG. 1 depicts four systems. The four systems include: (1) a card holder's user device 110; (2) an exchange service 120; (3) a third party retailer card program 130, where the third party retailer is the issuer of the gift card in question; and (4) a merchant system 140. Merchant system 140 may be operated by another party (e.g., First Data Valuelink™ or Comdata SVS™) that provides card management services to multiple merchants that issue their own gift cards.

User device 110 is not limited to any particular device. Non-limiting examples of user device 110 include a laptop computer, a tablet computer, a desktop computer, and a "smartphone", which includes telephone capabilities.

Although exchange service 120 is depicted as a single device in FIG. 1, exchange service 120 may comprise multiple devices that operate in concert to provide an exchange service to users. In one embodiment, exchange service 120 is an entity that employs a network to facilitate the purchase and sale of closed-loop stored-value instruments and/or other value-ascertainable items (e.g., reward points).

Each of the four systems may communicate via respective networks 150. Alternatively, merchant system 140 does not communicate with exchange service 120 over a network 150, but rather over a direct link. Networks 150 may be implemented by any medium or mechanism that provides for the exchange of data between various nodes in the network. Examples of such a network include, without limitation, a network such as a Local Area Network (LAN), Wide Area Network (WAN), Ethernet, and/or the Internet, and/or one or more terrestrial, satellite, or wireless links. The network may include a combination of networks such as those described. The network may transmit data according to Transmission Control Protocol (TCP), User Datagram Protocol (UDP), and/or Internet Protocol (IP), for example.

Example of Exchanging a Value-Ascertainable Item

Figure 2:
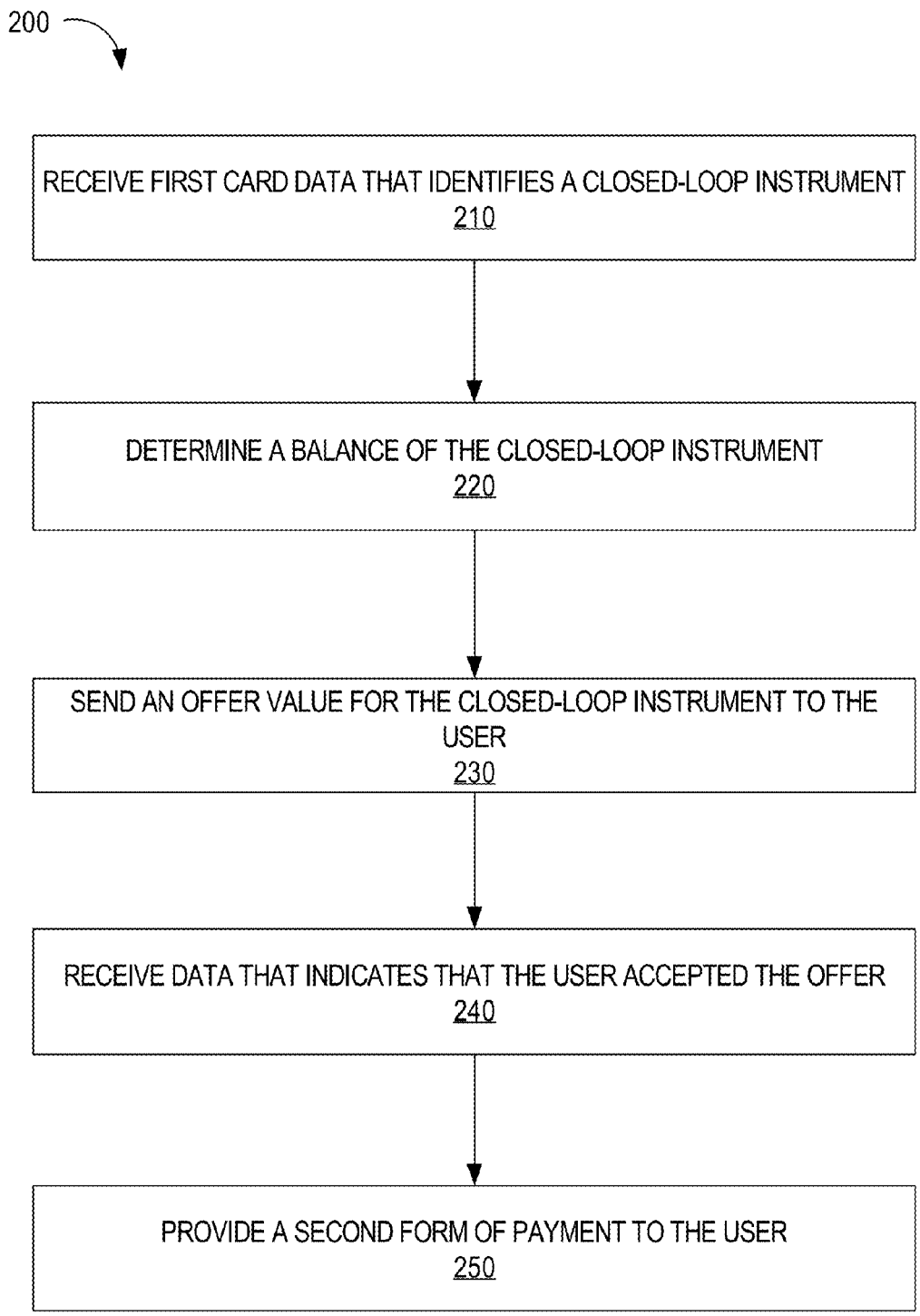
FIG. 2 is a flow diagram that depicts a process for allowing a user to convert a value-ascertainable item (e.g., a gift card) into another form of payment, according to an embodiment.

FIG. 2 is a flow diagram that depicts a process 200 for allowing a user to convert a value-ascertainable item (e.g., a gift card) into another form of payment, according to an embodiment. Process 200 may be implemented by exchange service 120 and, optionally, one or more other entities. Although only a few blocks are depicted in FIG. 2, FIG. 2 may comprise further blocks, as is described below.

At block 210, exchange service 120 receives item data that identifies or describes a value-ascertainable item that will be traded in for something else of value. Such a value-ascertainable item is referred to as a "trade-in item" or a "to-be-exchanged item." For example, in the case of a gift card, the item data is an account number associated with the gift card. In the case of a DVD, the item data is a name of a movie or other content recorded on the DVD. The item data may be received from user device 110.

At block 220, exchange service 120 determines a value of the trade-in item. The manner in which the determination is performed depends on the type of trade-in item. For example, in the case of a gift card, exchange service 120 uses the account number of the gift card to determine the current balance of the gift card.

Determining the current balance of a closed-loop stored-value instrument may involve exchange service 120 accessing one or more web pages, one of which includes the balance. The process of automatically requesting a web page, entering data into a web form, submitting the web form, and analyzing another web page to determine a balance of a closed-loop stored-value instrument is referred to as "web scraping." Alternatively, exchange service 120 requests the balance from third party retailer card program 130, which responds to exchange service 120 with the balance. This is referred to as a "direct connection" with the issuer's card program. Thus, in an embodiment, for some closed-loop stored-value instruments, exchange service 120 uses web scraping while for other closed-loop stored-value instruments, exchange service 120 uses a direct connection to an issuer's card program.

Once the balance of a closed-loop stored-value instrument is determined, exchange service 120 determines a value of the closed-loop stored-value instrument. For example, exchange service 120 may determine that people are purchasing $100 Merchant A's gift cards for $95. This $95 value may be considered the "market value" of a $100 Merchant A's gift card. Exchange service 120 then selects a value that is less than $95, such as $90. In this way, exchange service 120 can make a profit when exchange service 120 purchases an item for one amount and sells the item for a second amount that is greater than the first amount. Alternatively, exchange service 120 applies a static or dynamic formula to determine the value of the item, such as 90% of the balance of the gift card (if the item is a gift card) or 90% of the determined market value of the item.

As another example, in the case of reward or loyalty points, exchange service 120 uses an account number associated with the user (or authentication information of the user) to request, from the issuer of the reward points, the number or amount of reward points that the user has. Exchange service 120 determines a market value of the points, which may be $0.003 per point. Exchange service 120 then determines a value of the points based on the market value, such as $0.0025 per point, which may be used to generate an offer for the points. For example, if the user has 40,000 reward points and exchange service 120 determines that it can make a profit by purchasing the points for $0.0025 per point, then exchange service 120 may offer $100 for the 40,000 reward points.

As another example, in the case of a DVD, exchange service 120 determines a market value of the DVD based on one or more sources, which may include sources external to exchange service 120. Exchange service 120 itself may also be a source of market value information for the DVD if, for example, exchange service 120 has sold other DVDs with the same title.

At block 230, once a value of the trade-in item is determined, exchange service 120 sends, to the user, an offer that indicates the value. The data sent to user device 110 not only includes the value that user device 110 displays but also includes means to allow the user to accept or reject the offer, such as one or more graphical buttons.

At block 240, exchange service 120 receives response data that indicates that the user accepted or rejected the offer. The response data may be received from user device 110.

If the user rejected the offer, then exchange service 120 may not provide any more offers for the trade-in item owned by the user. Alternatively, exchange service 120 may generate and send another offer to the user for the trade-in item.

If the user accepted the offer, then control proceeds to block 250.

At block 250, exchange service 120 provides a second form of payment to the user. There are many possible forms of payment that exchange service 120 may provide. Examples of a second form of payment include sending cash or a check to the user. Sending a check may involve sending an online payment to the user's checking account if exchange service 120 is in possession of the necessary data to do so, such as a checking account number and a routing number.

Another example of a second form of payment is credit that is applied to a certain account of the user, such as a PayPal account, a utilities (e.g., gas and electric) account, or a credit card account. In each of these situations, exchange service 120 has access to the necessary account information and any other information necessary to automatically credit the account. Such information may be provided by the user to exchange service 120 during process 200 or some time prior to process 200.

The examples thus far of second forms of payment involve monetary-based accounts where the accounts indicate an amount in a national currency, such as dollars, euros, yen, or the yuan. Another example of a second form of payment involves crediting a non-monetary-based account, such as an account for a rewards or loyalty program. An example of such an account is one that is based on an airline program that distributes points for using the airline. Another non-monetary-based account is one that includes virtual currency. An example of virtual currency is Zevex currency, which is a game currency that can be used to purchase virtual items in multiple online games. Embodiments of the invention are not limited to any particular type of account that is associated with a user and that may be credited.

As another example of a second form of payment that exchange service 120 provides is another value-ascertainable item, such as a digital product or a physical product. For example, exchange service 120 provides electronic equipment to a user in exchange for a gift card owned by the user.

Another example form of payment that a user in block 250 may receive is digital currency that is maintained by exchange service 120 but that is not yet converted to another form of currency. For example, exchange service 120 may provide, to the user, an electronic account that is credited each time the user has trade in or sold one or more trade-in items to exchange service 120. The electronic account is referred to herein as a "digital wallet" (described in more detail below). A digital wallet may be viewed as a debit card account maintained by exchange service 120, although the user may not be able to pay for items with the amount reflected in the digital wallet. Instead, the balance of a digital wallet may be viewed as temporary currency that is yet to be converted into currency that is recognizable by a merchant. Thus, the user is not required to make an immediate purchase with the value of an offer, from exchange service 120, that the user accepted.

In an embodiment, exchange service 120 provides multiple types of payment to a user in exchange for a value-ascertainable item owned by the user. For example, exchange service 120 provides, to a user, first merchant credit (e.g., in the form of an account identifier) that is redeemable at merchant A and second merchant credit that is redeemable at merchant B in exchange for a gift card owned by the user. Similarly, the different forms of payment are for the same merchant but for different products and/or services provided by the merchant. For example, exchange service 120 may provide (1) first merchant credit that is usable to purchase movies from merchant A and (2) second merchant credit that is usable to purchase music from merchant A.

In an embodiment, a second form of payment involves providing merchant credit to the user. The merchant credit may be in the form of a gift card issued by the merchant. If the gift card is physical, then exchange service 120 causes a physical card to be mailed to the user.

Additionally or alternatively, exchange service 120 associates a value with a "new" account of the merchant. The account is "new" in that the account has a zero balance and is considered inactive. The "new" account may be identified by any set of values, such as a series of alphanumeric characters. Exchange service 120 may store a record or data that associates a "new" account with the value accepted by the user. After a "new" account is associated with a user and/or a non-zero balance, the account is considered active.

Exchange service 120 maintains a set of one or more new account identifiers that each identifies a new account. Each new account may be considered "inactive" until exchange service 120 associates a balance with the new account and/or information about the new account is sent to a user that provided something of value (e.g., cash, credit card, trade-in item) in exchange for the new account. The new account identifiers may be established by the merchant or by exchange service 120 based on an agreement with the merchant. For example, the merchant may provide the new account identifiers to exchange service 120 (e.g., from merchant system 140) prior to a user requesting merchant credit from exchange service 120 in exchange for a trade-in item. Alternatively, exchange service 120 may request a new account identifier from the merchant (e.g., by interacting with merchant system 140) in response to the user requesting merchant credit.

A new merchant account may be associated with a user at one of multiple possible times. For example, a user may have a digital wallet maintained by exchange service 120 and may have converted (or redeemed) a gift card into dollar-denominated currency that the digital wallet reflects. At the time of the conversion, the user might not know what the user will purchase with the currency. Later, the user may instruct exchange service 120 to convert some of the user's currency into a credit that is redeemable at a particular merchant.

As another example, a user may request exchange service 120 to accept the user's trade-in item in exchange for credit that is usable at a particular merchant. Thus, a single transaction with exchange service 120 may involve exchange service 120 accepting a trade-in item from a user and providing merchant credit to the user as a result.

Once a new merchant account has been associated with a user, the user may use at least a portion of the value associated with the new merchant account to purchase one or more items or services from the merchant. Exchange service 120 may provide merchant credit to a user in one of multiple possible ways. For example, exchange service 120 may send a merchant account identifier to a device (e.g., via SMS) or to an email account of the user. The user may then enter the account identifier in a web browser that displays a webpage provided by the merchant. As another example, exchange service 120 may send a bar code to a mobile device of the user some time before or while the user (with his/her mobile device) is located in a store of the merchant. The mobile device displays the bar code, which can be read by a merchant bar code scanner in order to determine a balance associated with the account.

Transferring Account Balances

Over time, exchange service 120 may come to own many closed-loop stored-value instruments by purchasing those instruments from multiple users. In an embodiment, the balance of a closed-loop stored-value instrument (e.g., a gift card) issued by a particular merchant transfers wholly to another account recognized by the particular merchant. Thus, merchant credit that exchange service 120 offers may be restricted to a value that was previously associated with an account maintained by the particular merchant. For example, in the context of gift cards, a first user owns a $100 gift card issued by a particular merchant. The first user exchanges the first gift card, through exchange service 120, for something else of value, such as $85 cash or reward points for another merchant. After the exchange, exchange service 120 owns the balance associated with the first gift card while the liability reflected by the first gift card (i.e., $100) remains with the particular merchant. The first gift card is deactivated and/or the balance of the first gift card is zeroed so that the first user (or any other user) cannot use the first gift card to purchase any item from the particular merchant. Later, exchange service 120 applies the $100 to a new account recognized by the particular merchant. Exchange service 120 provides (e.g., sells) the new account with the $100 balance to a second user. The second user may have purchased the new account from exchange service 120 for cash or may have traded another value-ascertainable item for credit usable at the particular merchant. In either case, exchange service 120 instructs the particular merchant to apply the balance that was previously on the first gift card (i.e., $100) to the new account. Thus, the balances of traded-in gift cards (or other closed-loop stored-value instruments) may be transferred to an equal number of new accounts.

Alternatively, there may be no balance-to-single account restriction, as least for some issuers. For example, exchange service 120 may purchase, from four different users, four $100 gift cards issued by a particular merchant and offer (or sell), to a single user, a single new $400 gift card redeemable at the particular merchant. As another example, exchange service 120 may purchase a single $100 gift card issued by a particular merchant and offer (or sell), to each of four different users, a $25 gift card redeemable at the particular merchant.

Alternatively to deactivating an exchanged (or "purchased" gift card from the perspective of exchange service 120), exchange service 120 escrows the funds that otherwise would be paid out in order to secure the balance of the exchanged gift card. In both alternatives, the transaction is secure. In both alternatives, exchange service 120 ensures that the balance is present when an eventual buyer from exchange service 120 redeems the exchanged gift card.

Digital Wallet

A digital wallet is an electronic account that is associated with a particular user and identifies one or more value-ascertainable items that the particular user owns. Exchange service 120 maintains a digital wallet for each of multiple users that are registered with exchange service 120. A registered user of exchange service 120 may have user credentials (e.g., a username and password) that is unique to the user. When logging in to exchange service 120, the user (or an application) provides the user credentials to exchange service 120, which authenticates the user based on the user credentials.

A user of a digital wallet may access his/her digital wallet through a web browser or through a dedicated application that executes on the user's device (e.g., user device 110), such as a mobile application. This application is referred to herein as the "local digital wallet application" and may be developed and provided by exchange service 120. Although the following examples refer to exchange service 120 performing certain steps, some or all of those steps may alternatively be performed by a local digital wallet application of a user.

Exchange service 120 provides an interface through which a user may upload information about one or more gift cards owned by the user. For example, the user enters in a gift card account identifier (and, if necessary, a PIN) into one or more fields of a display provided by exchange service 120 (or by the local digital wallet application). Exchange service 120 (or the local digital wallet application) stores information about the gift card in the user's digital wallet including, for example, information about the balance of the corresponding gift card. Exchange service 120 updates the user's digital wallet to reflect the new gift card (presuming the gift card number is valid and the balance is positive or above a certain threshold, such as $9).

As another example, a user of user device 110 may attach a card reader to user device 110. The user may then "run" or "swipe" a gift card through the card reader, which identifies an account identifier (usually a series of numbers) and, optionally, a PIN. The local digital wallet application may send the account information to exchange service 120, which determines the balance on the gift card and updates the user's digital wallet to reflect the new gift card.

As another example, optical character recognition (OCR) may be used to capture card information. A mobile device may have a camera that captures a digital image of a gift card. An OCR application, which may be integrated in the local digital wallet application, automatically identifies account identification information reflected in the digital image. The local digital wallet application may send the account identification information to exchange service 120, which determines the balance on the gift card and updates the user's digital wallet to reflect the new gift card.

A value-ascertainable item that is reflected in a user's digital wallet is hereinafter referred to as a "registered value-ascertainable item." Over time, a user may accumulate a large collection of registered value-ascertainable items.

By maintaining a digital wallet for a user, exchange service 120 effectively virtualizes the user's registered value-ascertainable items, which become much more mobile in their use as a means for payment and transferable in the marketplace run by exchange service 120.

Local Digital Wallet View

Figure 3:
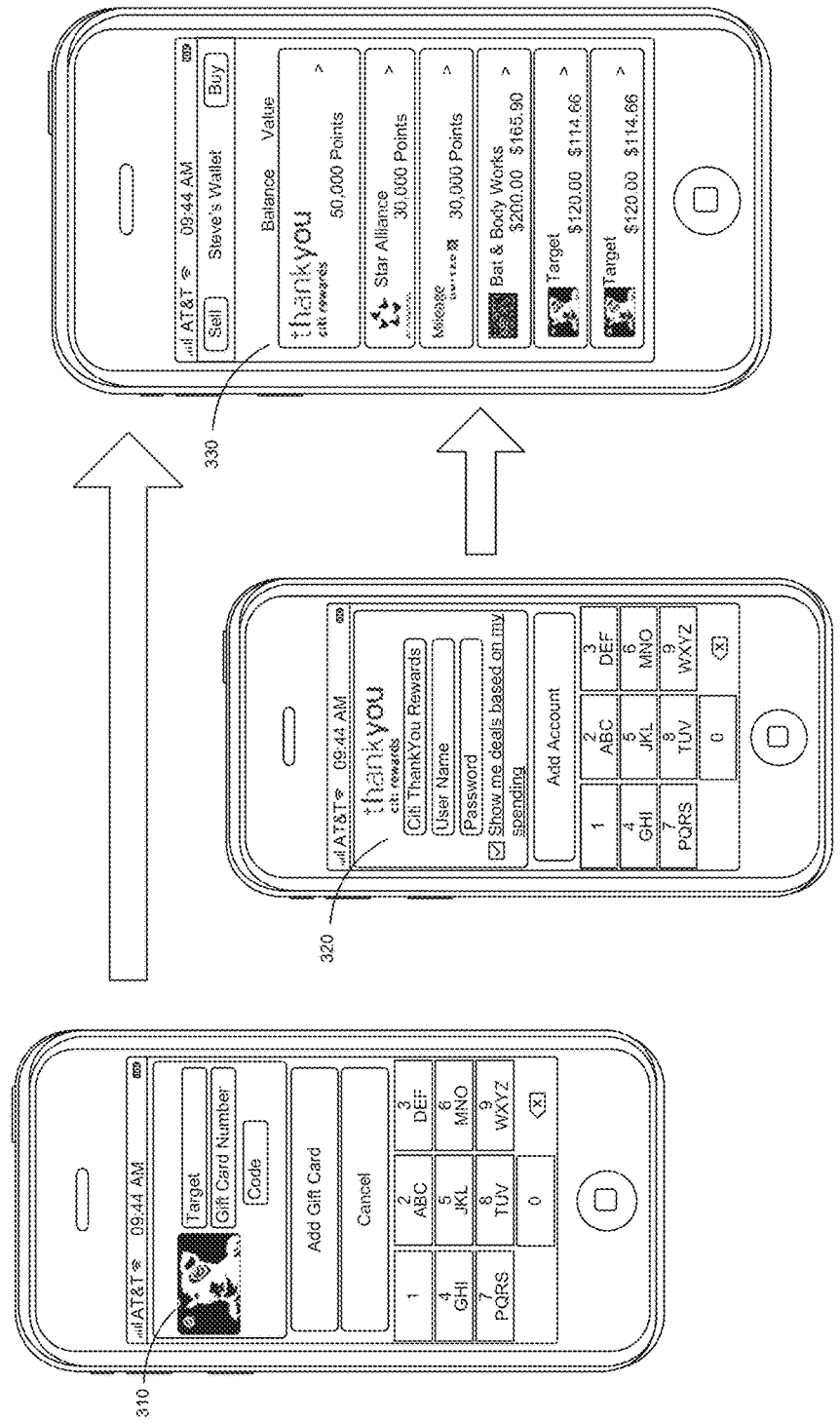
FIG. 3 is a diagram that depicts an example of a local view of a digital wallet, according to an embodiment.

A user may manage the items reflected in the user's digital wallet using a local digital wallet application or using an interface provided by exchange service 120 through a web browser executing on a device. FIG. 3 is a diagram that depicts an example of a local view of a digital wallet, according to an embodiment. Display 310 is an interface that allows a user to enter information about a gift card issued by a particular merchant. Specifically, display 310 includes text fields to allow the user to enter a gift card number and a code. Display 310 also includes an "Add Gift Card" button that causes the local digital wallet application to send the gift card data to exchange service 120.

Display 320 is an interface that allows a user to enter information about the user's loyalty points account associated with a points program run by a particular merchant. Specifically, display 320 includes text fields to allow the user to enter login information (e.g., a user name and password) of the user's account that the issuer of the loyalty points maintains. Display 320 also includes an "Add Account" button that, when selected, causes the local digital wallet application to send the account login information to exchange service 120.

Display 330 includes information about a user's (Steve in this example) digital wallet. Specifically, display 330 lists six value-ascertainable items that are registered with exchange service 120. Three of the items are loyalty or reward points, including the points program reflected in display 320. The three other items listed in display 330 are gift cards, including a gift card issued by the merchant indicated in display 310. Display 330 also lists the balance of each value-ascertainable item listed in display 330. The balance of each loyalty points program is reflected in a number of points while the balance of each gift card is reflected in a dollar amount. For each gift card, display 330 also lists a dollar value that the user of the digital wallet may receive in exchange for selling the gift card to exchange service 120. Thus, for example, for each $120 Target gift card in the user's digital wallet, exchange service 120 will pay the user $114.66. The user may initiate the sell by clicking on the "Sell" button depicted in display 330 or by selecting the item (e.g., the Star Alliance points) the user desires to sell.

The information in displays 310-330 may be generated by exchange service 120 and sent to the local digital wallet application. Alternatively, the information in displays 310-330 may be generated by the local digital wallet application without having to request information from exchange service 120. Alternatively, some of the information in displays 310-330 may be generated locally by the local wallet application whiles other of the information may be generated remotely by exchange service 120.

Online Digital Wallet View

Figure 4:
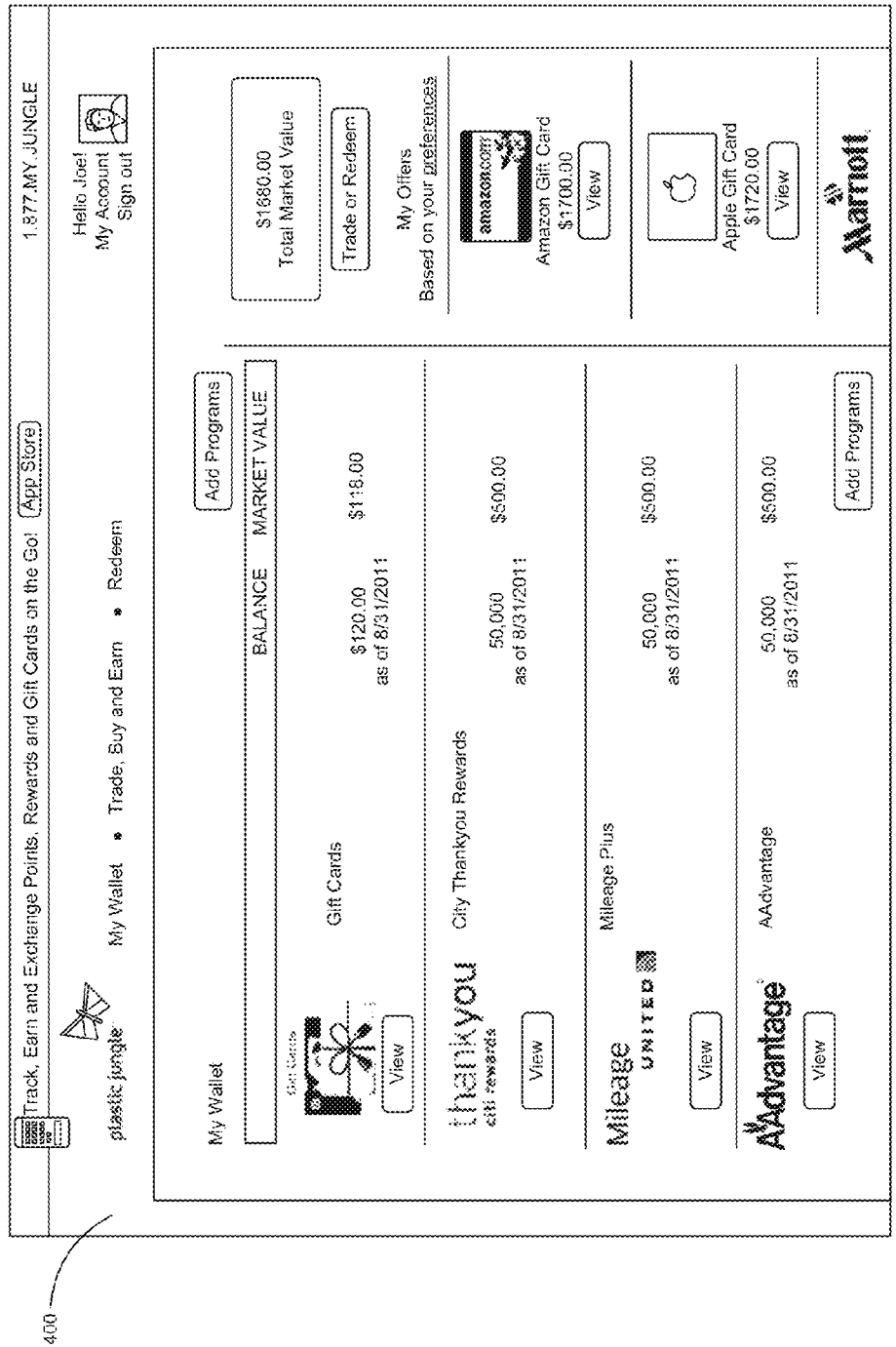
FIG. 4 is a diagram that depicts an example of an online view of a digital wallet, according to an embodiment.

FIG. 4 is a diagram that depicts an example of an online view of a digital wallet, according to an embodiment. Due to the generally larger screen size of tablet computers, laptop computers, and desktop computers, more data about a user's digital wallet may be displayed relative to the amount of data that may be displayed on device with a smaller screen, such as a mobile phone, which will typically access a digital wallet using a dedicated application.

Display 400 lists identities of registered value-ascertainable items. The information reflected in display 400 is generated by exchange service 120. Display 400 is provided by a web browser application in response to a request for information (e.g., in the form of a URL) from exchange service 120. Display 400 lists four value-ascertainable items, one of which corresponds to one or more gift cards. The balance of the one or more gift cards is $120 and the market value of those gift card(s) is $118. Thus, if the user decided to sell the gift card(s) to exchange service 120, then exchange service 120 would purchase them for $118.

Display 400 also lists the balance (in points) of three rewards programs, along with their corresponding market value. In this example, the number of points received by the user in each rewards program is 50,000 and the market value of each rewards program is $500.

Display 400 also displays a total market value of all the items in the user's digital wallet. The total market value reflects the amount of value that exchange service 120 would provide to the user if the user decided to sell all the items in the digital wallet to exchange service 120. In this example, the total market value of the value-ascertainable items in the user's digital wallet is $1,680.00. Display 400 includes a "Trade or Redeem" button that, when selected, causes a new page to be displayed that allows the user to trade or redeem one or more or all (in one transaction) of the registered value-ascertainable items. Exchange service 120 may "redeem" one or more registered items by, for example, crediting a debit card, credit card, PayPal, or other account of the user. Display 400 may not reflect the entire web page, at least a portion of which is shown in display 400. For example, display 400 may only include some of the offers that are available to the user. Thus, a web browser that displays display 400 may allow the user to scroll down the web page to view additional offers that are available to the user.

In an embodiment, the local digital wallet application or exchange service 120 provides an interface that allows a user to acquire one or more gift cards from exchange service 120. The user may acquire one or more gift cards through traditional payment means, such as by sending cash to a certain address affiliated with exchange service 120 or by allowing exchange service 120 to debit a credit card account or a debit card account of the user. Additionally or alternatively, the user may acquire one or more gift cards by exchanging one or more gift cards (i.e., owned by the user) for the one or more exchanged-for gift cards. The exchanged or trade-in gift card may already be registered with exchange service 120 or account information of the exchanged gift card may be provided to exchange service 120 as part of the exchange transaction. In the latter scenario, the exchanged gift card may not necessarily be reflected in the user's digital wallet.

In either the online view or the local view, exchange service 120 may order the list of identities of registered value-ascertainable items based on one or more criteria. For example, the one or more criteria may include explicit or implicit preferences of the user (described in more detail below). As another example, the one or more criteria may include the current geographical location of the user relative to the location of a store of a merchant that issued one of the registered value-ascertainable items. As another example, the one or more criteria may include the balance of registered value-ascertainable items of a particular type (e.g., gift cards). As another example, the one or more criteria may include the cash value that exchange service 120 is willing to pay for each registered value-ascertainable item.

Local v. Online Digital Wallet

In an embodiment, the local digital wallet application maintains information about the contents of the user's digital wallet separate from the information that exchange service 120 maintains for the user's digital wallet. The digital wallet maintained by the local digital wallet application is referred to herein as the "local digital wallet." The digital wallet information maintained by exchange service 120 is referred to herein as the "online digital wallet."

One advantage of the local digital wallet application maintaining a local digital wallet separate from the online digital wallet is that a user is not required to be connected to the Internet in order to view the user's registered value-ascertainable items and redeem one or more of those items at a merchant. The user may check the contents of the user's digital wallet at any time. For example, the local digital wallet application may have the capabilities to generate a bar code of registered gift card that the user selects to redeem at a particular merchant that accepts the registered gift card or is otherwise capable of redeeming the registered gift card. The bar code may then be scanned at the particular merchant to identify an account identifier of the gift card so that at least a portion of the balance of the gift card may be used to make a purchase at the particular merchant.

At various times (whether periodically or in response to certain events), the local digital wallet is synced with the online digital wallet. For example, if a user modifies the contents of the local digital wallet (e.g., by purchasing a gift card, uploading information about a new gift card, exchanging a gift card for another gift card, or redeeming a gift card), then the local digital wallet application communicates the changes over a network to exchange service 120, which modifies the contents of the online digital wallet accordingly.

As another example, a user modifies the contents of the online digital wallet. The user may use any device that can connect to the Internet, including a device that is different than the device that executes a local digital wallet application. Later, when the local digital wallet application detects a connection to the Internet, the local digital wallet application communicates with exchange service 120 to sync the local and online digital wallets so that the changes in the online digital wallet are reflected in the local digital wallet.

Purchasing a Value-Ascertainable Item

Figure 5:
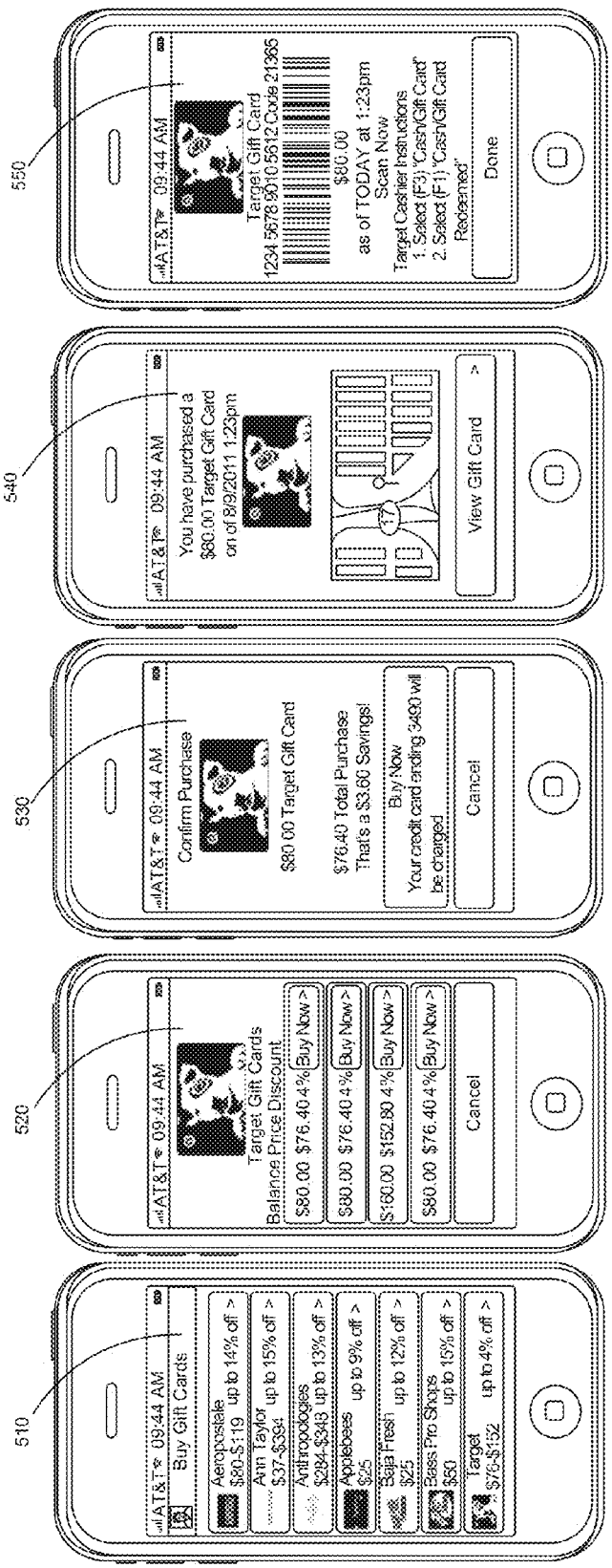
FIG. 5 depicts an example of purchasing and redeeming a gift card, according to an embodiment.

FIG. 5 depicts an example of purchasing and redeeming a value-ascertainable item, according to an embodiment. Display 510 includes a list of merchants, each of which is associated with a single value or a range of values. A range of values indicates that multiple gift cards issued by the corresponding merchant are available for purchase by the user. Each user-selectable item in the list also indicates a percentage discount that is available for a gift card available from the merchant. In this example, the user selects the last item in the list, which causes display 520 to be shown to the user.

The discount gift cards associated with the list of merchants in display 510 may have been purchased previously by exchange service 120 from other users. Alternatively, one or more of the gift cards may be gift card(s) that the corresponding merchant allowed exchange service 120 to activate for the merchant. To activate a new gift card, exchange service 120 may select an account identifier from a set of account identifiers that identify non-activated gift cards of the merchant. Activating a gift card of the merchant may cause a liability to be created for the merchant. In this way, there is no discount for the user that purchases such activated gift cards. However, the merchant may compensate exchange service 120 for activating such gift cards. The compensation may be based on, for example, (a) each activated gift card that is purchased through exchange service 120 (e.g., 2% of the purchase price) or (b) the amount of balance of an activated gift card that is redeemed (e.g., 2 cents for each dollar spent) at the merchant.

Display 520 lists multiple gift cards that exchange service 120 is offering for sale. Each gift card includes a balance that is on the gift card, a price for the gift card, and a percentage discount that is calculated by dividing the price by the balance. In this example, the user selects a "Buy Now" button associated with one of the $80 gift cards, which causes display 530 to be shown to the user.

Display 530 indicates information about the selected gift card from display 520, including the balance on the gift card and the price of the gift card. Display 530 includes a "Buy Now" button and a "Cancel" button. In this example, the user selects the "Buy Now" button. As a result, exchange service 120 may charge a debit card (or, in this example, a credit card) of the user. Exchange service 120 also stores an account identifier that identifies the purchased gift card in association with the user's digital wallet. At that point, the gift card is said to be "in" the user's digital wallet. Selection of the "Buy Now" button also causes display 540 to be shown to the user.

Display 540 indicates that the user successful purchased the selected gift card. Display 540 includes a "View Gift Card" button that, when selected, causes display 550 to be shown to the user. Display 540 also includes a map that depicts a location of one of the stores of the corresponding merchant (e.g., that is nearest to the device that executes the local digital wallet application).

Display 550 indicates a balance of the selected gift card and includes a bar code that reflects an account identifier of the selected gift card and, optionally, a code or PIN associated with the gift card, if one exists. The user may be then have the bar code scanned by a bar code reader at the corresponding merchant when completing a purchase of one or more goods or services from the merchant. Thus, a user may purchase a gift card using exchange service 120 and immediately use the gift card in store or online. Alternatively, the bar code may be displayed on a device that is connected to a printer (e.g., in the user's home or office). The user may instruct the local digital wallet application to send the bar code to the printer. The user may then take the printed bar code to the merchant to be used when making a purchase from the merchant.

The information in displays 510-550 (and the displays in FIGS. 6-11) may be generated by exchange service 120 and sent to the local digital wallet application. Alternatively, the information in displays 510-550 (and the displays in FIGS. 6-11) may be generated by the local digital wallet application without having to request information from exchange service 120. Alternatively, some of the information in displays 510-550 (and the displays in FIGS. 6-11) may be generated locally by the local wallet application whiles other of the information may be generated remotely by exchange service 120.

Redeeming a Registered Item

Figure 6:
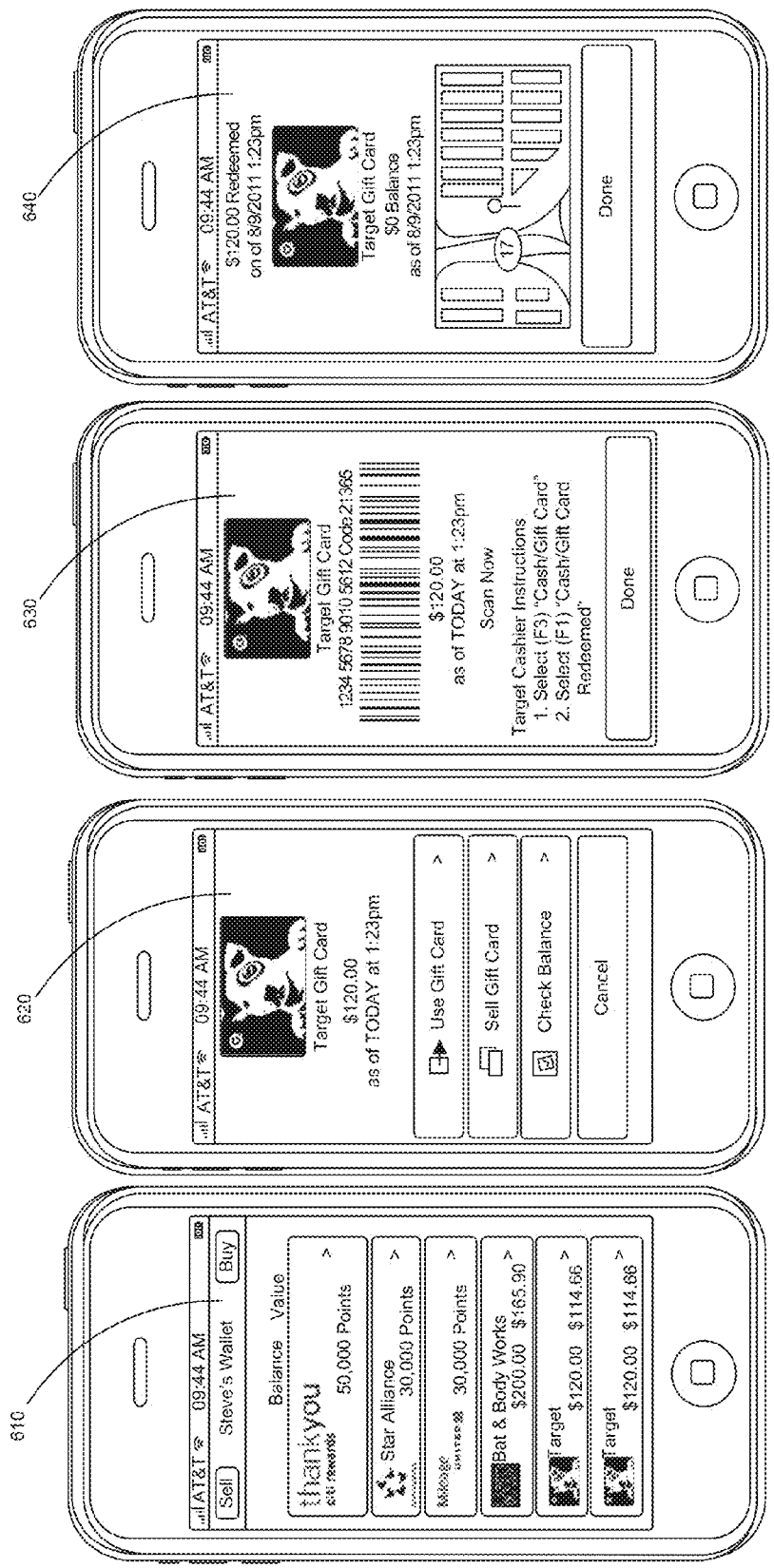
FIG. 6 is a diagram that depicts an example of redeeming a registered value-ascertainable item, according to an embodiment.

In an embodiment, the local digital wallet application or exchange service 120 provides an interface that allows a user to redeem a registered item (i.e., reflected in the user's digital wallet). FIG. 6 is a diagram that depicts an example of such a redemption scenario, according to an embodiment. The local digital wallet application causes displays 610-640 to be shown on the user's mobile device. Displays 610-640 may be generated by the location digital wallet application or by exchange service 120, which provides the displays to the local digital wallet application over a network.

Display 610 lists six selectable items in a user's (e.g., local) digital wallet. In this example, the user selects one of the last two items. In response, display 620 is shown to the user. Display 620 includes the balance of the selected gift card and four buttons: a "Use Gift Card" button, a "Sell Gift Card" button, a "Check Balance" button, and a "Cancel" button. The number and type of buttons that are included in display 620 may depend on the type of value-ascertainable item that is selected from display 610.

Between the time that a value-ascertainable item is registered for a user and the user desires to exchange or use the value-ascertainable item, the user may have reloaded value onto the value-ascertainable item (e.g., using a mechanism provided by the corresponding merchant) or made a purchase from the corresponding merchant using the value-ascertainable item. Thus, it is important for exchange service 120 (and the user) to check the balance of registered value-ascertainable items in order to have up-to-date information regarding the current balance of the registered value-ascertainable items.

If the "Check Balance" button is selected, then exchange service 120 checks the current balance of the selected gift card. As noted previously, exchange service 120 may employ one of multiple techniques (depending on the type of value-ascertainable item) to check the current balance of a value-ascertainable item. In an embodiment, exchange service 120 automatically checks balances of value-ascertainable items in response to one or more of the following events: periodically, a request to display the contents of a user's digital wallet, user selection of a value-ascertainable item listed in the user's digital wallet, and user selection of the "Use Gift Card" or the "Sell Gift Card" buttons.

In this example, the user selects the "Use Gift Card" button, which causes display 630 to be shown to the user. Display 630 includes a bar code that is generated by either a local digital wallet application or exchange service 120. Display 630 also includes a "Scan Now" instruction that prompts the user to have the bar code scanned in order to redeem the gift card. The user or a cashier at the corresponding store places the bar code in relation to the bar code reader such that the bar code reader scans the bar code. The merchant's card program is accessed using the gift card number (and in other information) reflected in the bar code. The merchant's card program deducts at least a portion of the balance from the gift card account. The deducted funds are applied to a purchase price of a set of one or more items that the user is purchasing from the merchant.

Selection of the "Done" button in display 630 causes the local digital wallet application to show display 640. Selection of the "Done" button may cause exchange service 120 (or the local digital wallet application) to perform a balance check of the gift card. Display 640 includes an amount that has been redeemed ($120 in this example) and an amount of the remaining balance on the gift card ($0 in this example).

In the example of FIG. 6, the user may cause display 630 to be generated at any time, such as while the user is in a store of the merchant or prior to the user arriving at the store.

Redeeming an Exchanged-for Item

In the example of FIG. 6, the user selects a registered value-ascertainable item to purchase a good or service provided by the issuer of the value-ascertainable item. In a different embodiment, exchange service 120 allows a user to convert a registered value-ascertainable item into a different value-ascertainable item that is acceptable at a merchant that is different than the issuer of the registered value-ascertainable item. For example, a user may desire to use a registered gift card that was issued by merchant A to purchase a good or service from merchant B.

Figure 7:
FIG. 7 is a diagram that depicts an example of redeeming an exchanged-for item, according to an embodiment.

FIG. 7 is a diagram that depicts an example of redeeming an exchanged-for item, according to an embodiment. Display 710 lists six user-selectable items in a user's (e.g., local) digital wallet. In this example, the user selects the first value-ascertainable item in the list. Selection of that item causes display 720 to be generated.

Display 720 includes a description of the value-ascertainable item along with four buttons: a "Shop and Redeem Nearby" button, a "Browse Points" button, a "Browse Rewards" button, and a "Check Points Balance" button. In this example, the user selects the "Shop and Redeem Nearby" button. The user may select this button while the user is at home, while the user is in a car, or while the user is at a mall that includes many merchant stores. Selection of the "Shop and Redeem Nearby" button causes the local digital wallet application to determine a current geographical location of the device upon which the local digital wallet application executes. The local digital wallet application may send the current geographical location data to exchange service 120, which identifies merchant stores (1) that are nearby the user and (2) for which exchange service 120 has gift cards. Exchange service 120 may have purchased the gift cards from other users or may have partnered with one or more merchants to offer (for sale) "new" gift cards issued by the merchant(s). Exchange service 120 may receive a percentage of the amount of the balance of a "new" gift card or a percentage of the amount of the balance of the new gift card that is redeemed at the corresponding merchant.

Display 730 includes a map with (1) a "personal" pin indicating the current position of the user device and (2) a number of "store" pins indicating the location of merchant stores for which exchange service 120 offers gift cards. In other embodiments, the current location of the user is not shown on the map. Display 730 also includes a list of user-selectable gift cards and corresponding monetary values and distances from the current location of the user. The list of gift cards may be ordered based on distance to the user or based on monetary value. In this example, the user selects the fourth gift card listed in display 730. This selection causes the local digital wallet application to show display 740.

Display 740 allows the user to confirm the exchange, i.e., from the reward points to the gift card. Display 740 includes data that identifies the issuer of the to-be-exchanged-for gift card, the balance on that gift card, and the number of points of the to-be-traded-in item. Display 740 also includes a "Buy Now" button and a "Cancel" button. In this example, the user selects the "Buy Now" button, which causes display 750 to be generated.

Display 750 indicates the value of the gift card for which the user exchanged the reward points. In an embodiment, in response to the user acquiring the exchanged-for gift card, exchange service 120 identifies one or more sales, coupons, promotions (hereinafter "promotions") offered by the issuer of the gift card. In this example, display 750 lists promotions that are provided by the issuer of the gift card. One of the promotions indicates that if the user spends a certain amount of money (i.e., $150) at the merchant during a certain time frame, then the user will receive a percentage discount (i.e., 5%). The other listed promotions are tied to the purchase of specific goods that are for sale by the merchant. The promotions offered to a user may vary depending on various factors, such as the user's preferences (whether explicit or implicit), the time of day, and the amount of the gift card, regardless of whether the gift card was registered by the user with exchange service 120 or was purchased by the user through exchange service 120.

Display 750 also includes a "More Coupons" button that, when selected, displays one or more additional promotions provided by the merchant.

Display 760 is similar to display 630 of FIG. 6. Display 760 may be shown to the user in response to a selection of a "Use Gift Card" button (not shown in display 750) or in response to other input from the user. Display 760 may be shown much later than when displays 710-750 are shown. For example, displays 710-750 might be shown to the user on one day and display 760 might be shown to the user a month later. Thus, there is flexibility in when the user can redeem a first value-ascertainable item after the user has exchanged a second value-ascertainable item for the first item. This means that the user can effectuate, using a mobile device, a real-time trade of one value-ascertainable item for another that can be used immediately (or some time later) in store or online.

Points-for-Points Exchange

Figure 8:
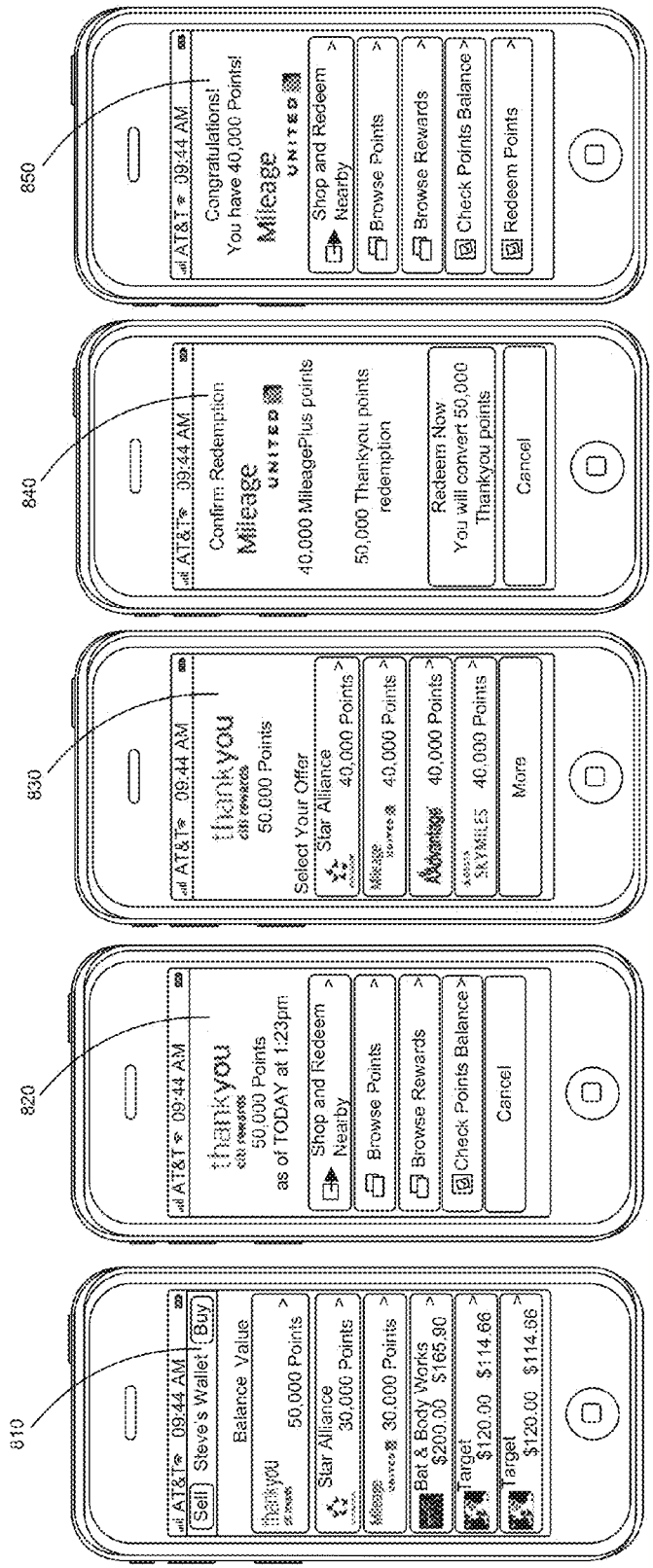
FIG. 8 is a diagram that depicts an example of such a points-for-points exchange, according to an embodiment.

In addition to exchanging a gift card for another gift card and points from a rewards program for a gift card, a user may use exchange service 120 to exchange points from one rewards program for points from another rewards program. FIG. 8 is a diagram that depicts an example of such a points-for-points exchange, according to an embodiment.

Display 810 lists six user-selectable items in a user's digital wallet. In this example, the user selects the first value-ascertainable item in the list. Selection of that item causes display 820 to be generated.

Display 820 includes a description of the value-ascertainable item (including the number of points earned from one merchant) along with five buttons: a "Shop and Redeem Nearby" button, a "Browse Points" button, a "Browse Rewards" button, a "Check Points Balance" button, and a "Cancel" button. In this example, the user selects the "Browse Points" button. The "Browse Points" button, when selected, allows the user to view one or more reward currencies, the points of which can be redeemed through exchange service 120.

The "Browse Rewards" button, when selected, allows the user to view rewards offered by the issuer of the points that the user can select directly from the issuer. For example, the user can select reward points directly from a merchant's point store. Selection of the "Browse Points" button causes display 830 to be shown to the user.

Display 830 includes the number of points of the selected points program and lists multiple user-selectable offers indicating various other points programs and a corresponding number of points that may be acquired in exchange for the selected points program. In this example, the user selects the second points program in the list, which causes display 840 to be displayed to the user.

Display 840 includes text that prompts the user to confirm the proposed exchange. Display 840 includes information about the to-be-exchanged points and the to-be-traded-in points. Display 840 also includes two buttons: a "Redeem Now" button and a "Cancel" button. In this example, the user selects the "Redeem Now" button, which causes the local digital wallet application to show display 850. If the user had selected the "Cancel" button, the local digital wallet application may have caused display 830 to be shown again.

Display 850 includes data that indicates that the points-for-points exchange occurred. In this example, the user received 40,000 points toward one points program (run by an airline company) in exchange for providing, to exchange service 120, 50,000 points towards a different points program (run by a credit card company). The exchanged-for points may be used immediately. Display 850 also includes five buttons: a "Shop and Redeem Nearby" button, a "Browse Points" button, a "Browse Rewards" button, a "Check Points Balance" button, and a "Redeem Points" button.

User Preferences

In an embodiment, exchange service 120 allows a user to identify one or more preferences. Exchange service 120 may use these preferences in a variety of ways, such as identifying value-ascertainable items (whether registered by the user or not) to present to the user, notifying the user about current promotions provided by one or more merchants, and/or notify the user when the user is geographically near a certain store.

The preferences may vary greatly. For example, a user may specify a particular merchant for which the user desires to use or acquire corresponding gift cards. As another example, a user may specify a particular merchant for which the user desires to receive corresponding promotions when they become available. As another example, a user may specify a certain type or class of value-ascertainable items, such as gift cards or points programs. As another example, a user may specify that the user desires to be notified of gift cards that have a certain discount, such as gift cards where the ratio of the price for the gift card to the balance on the gift card is below a certain percentage (e.g., 75%) or where the difference between the price of the gift card and the balance on the gift card is greater than a certain threshold (e.g., $25). As another example, a user may specify that the user desires to be notified of a discount gift card (i.e., that the user does not yet own) when the user is near a stored of the merchant that issued the discount gift card.

In each of these examples, exchange service 120 may provide a list of one or more gift cards (or other types of value-ascertainable items) in response to such input. Alternatively, the user may be notified of such value-ascertainable item(s) when the user is physically located near a store of a merchant that accepts one of the value-ascertainable item(s). Such an option may be selectable by the user.

As another example, a user may provide, to exchange service 120, login information of a credit card account or debit card account of the user. Exchange service 120 uses the login information to access the corresponding account and retrieve a list of merchants from which the user purchased goods or services. Based on the list, exchange service 120 infers which merchants the user might be interested in being notified about. For example, if a user makes a purchase from a particular merchant every month for six months or makes a certain number of purchases from the particular merchant in a certain period of time, then exchange service 120 stores merchant interest data that identifies the particular merchant and that is associated with the user. Exchange service 120 may use the merchant interest data to determine when or whether to send certain promotions to the user or to notify the user of gift cards issued by merchants identified in the merchant interest data. Exchange service 120 may periodically access the user's credit or debit card account(s) to retrieve the user's spending or purchase history.

Figure 9:
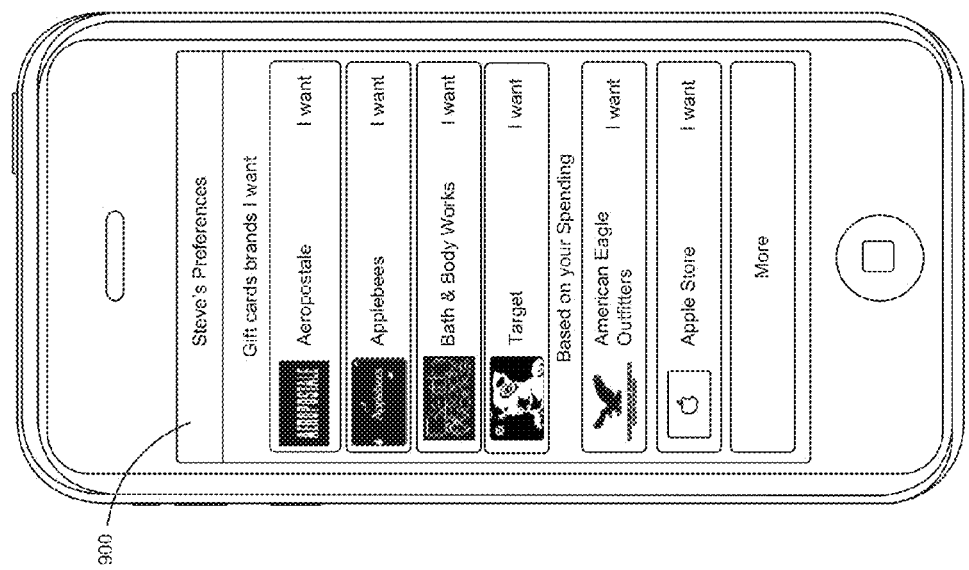
FIG. 9 is a diagram that depicts a display of preferences of a user, according to an embodiment.

FIG. 9 is a diagram that depicts a display 900 of preferences of a user, according to an embodiment. Display 900 lists two types of user preferences. One set of preferences indicates gift card brands (or merchants) that the user explicitly requested. The other set of preferences indicate merchants that exchange service 120 identified based on the user's spending history. Display 900 also includes a "More" button that, when selected, causes more gift cards or value-ascertainable items to be displayed. If there are no additional gift card brands that the user specified, then the additional merchants that are listed may be based on the user's spending history and/or based on which merchants have current promotions. For example, merchant M may pay exchange service 120 to notify users of exchange service 120 regarding a promotion offered by merchant M. Selection of the "More" button (or another button not shown) may, additionally or alternatively, cause a new display to be shown that allows the user to add, delete, or otherwise modify the user's preferences.

Figure 10:
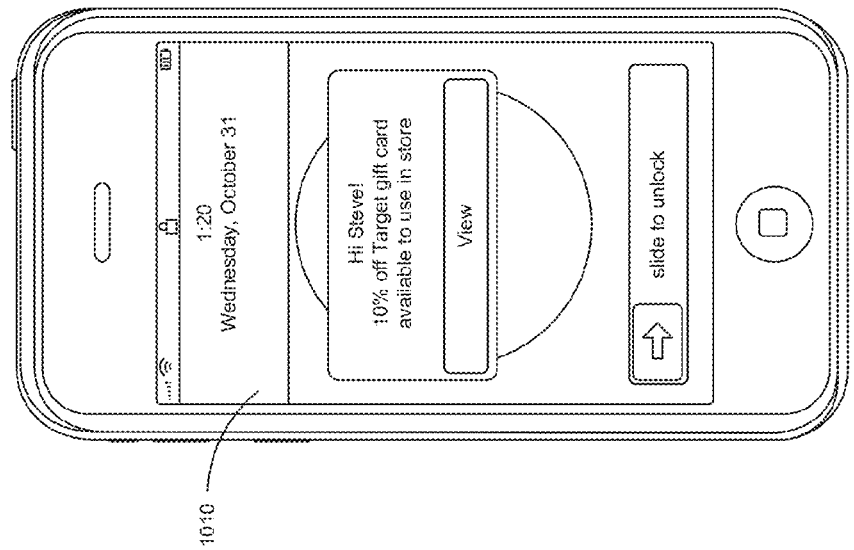
FIG. 10 is a diagram that depicts displays of notifications that an exchange service provides to a user's device, according to an embodiment.
Figure 10:
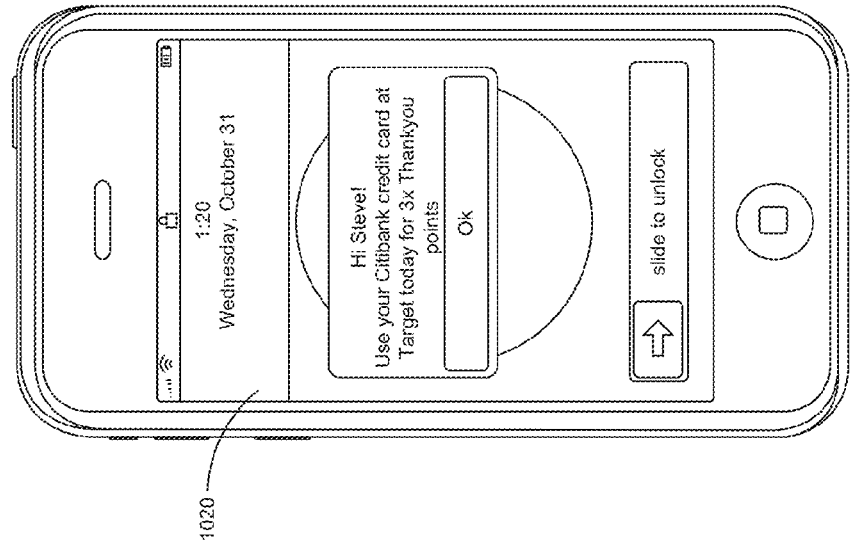

FIG. 10 is a diagram that depicts displays 1010 and 1020 of notifications that exchange service 120 provides to a user's device, according to an embodiment. Display 1010 includes (1) a notification that indicates a name of the user and a discount gift card that the user may acquire from exchange service 120 and (2) a "View" button that, when selected, causes another display (not depicted) to be shown that indicates additional details about discount gift card and provides a way for the user to acquire the discount gift card.

Display 1020 includes a notification that indicates a name of the user and information about a promotion provided by two merchants. The notification may be sent in response to exchange service 120 (or a local digital wallet application) determining that the promotion became available and that user preference data indicates that the user desired to be notified of promotions related to one or both of the merchants.

Returning to FIG. 4, display 400 includes a "My Offers" section that includes offers to a user. Exchange service 120 identifies the offers based on preferences (whether explicit or implicit, such as from spending history) of the user. The user may select the link embedded in the "preferences" text in order to change or update the user's preferences. The displayed offer may also be selected for display based on business incentives that one or more merchants provided to exchange service 120. For example, merchant M may pay exchange service 120 for each gift card or promotion of merchant M that is displayed to the user. Each of the offers may be selected by selecting the corresponding "View" button or the graphic that identifies the corresponding item, which causes additional details about the offer to be displayed to the user and to allow the user to accept the offer.

Geo-Aware Application

In an embodiment, the local digital wallet application is "geo-aware." The local digital wallet application determines a current geographical location of the device upon which it executes (e.g., user device 110). Embodiments of the invention are not limited to any particular technique for making the determination. Examples of techniques that the local digital wallet application may leverage to determine the current geographical location of a device include GPS, Galileo, and GLONASS.

In an embodiment, the geo-aware application uses its knowledge of the current location of user device 110 to determine whether to send certain information to the user of user device 110. Alternatively, the geo-aware application sends the current location of user device 110 to exchange service 120, which uses that information to determine whether to send certain information to the user of user device 110.

For example, if the geo-aware application (or exchange service 120) determines that user device 110 is within a certain distance of a store of a particular merchant that is currently offering a promotion, then the geo-aware application notifies the user of the promotion. Examples of such notifications are depicted in displays 1010 and 1020 of FIG. 10. Another example of a notification is a text message or an email message that is sent to an email address provided by the user.

As another example, if the geo-aware application (or exchange service 120) determines that user device 110 is within a certain distance of a store of a particular merchant that issued a gift card that exchange service 120 owns or that can issue a gift card that exchange service 120 can provide to users, then the geo-aware application notifies the user of such a gift card. The user is then able to acquire the gift card (e.g., by purchasing the gift card using traditional payment options or exchange another item for the gift card).

As another example, the user may have explicitly specified a certain merchant about which exchange service 120 is to notify the user when the user is near a store of that merchant and/or when a promotion is available from that merchant.

"Stacking" Registered Items with Merchant Promotions

As noted previously, a merchant may offer a promotion to entice users to make purchases from the merchant. Exchange service 120 acts as a delivery mechanism for such promotions. Because exchange service 120 provides discounted gift cards to users, exchange service 120 can combine a user's purchase of a discounted gift card with a promotion of a merchant that issued the discounted gift card. Such a combining of gift cards with promotions is referred to herein as "stacking." In an embodiment, exchange service 120 informs a user of a digital wallet about stacking opportunities, either in response to an explicit request from the user or in response to exchange service 120 determining to notify the user of the stacking opportunity. The trigger of the notification may be determining that the user is near a store of a "stacking" merchant or based on an advertising campaign of the stacking merchant.

Figure 11:
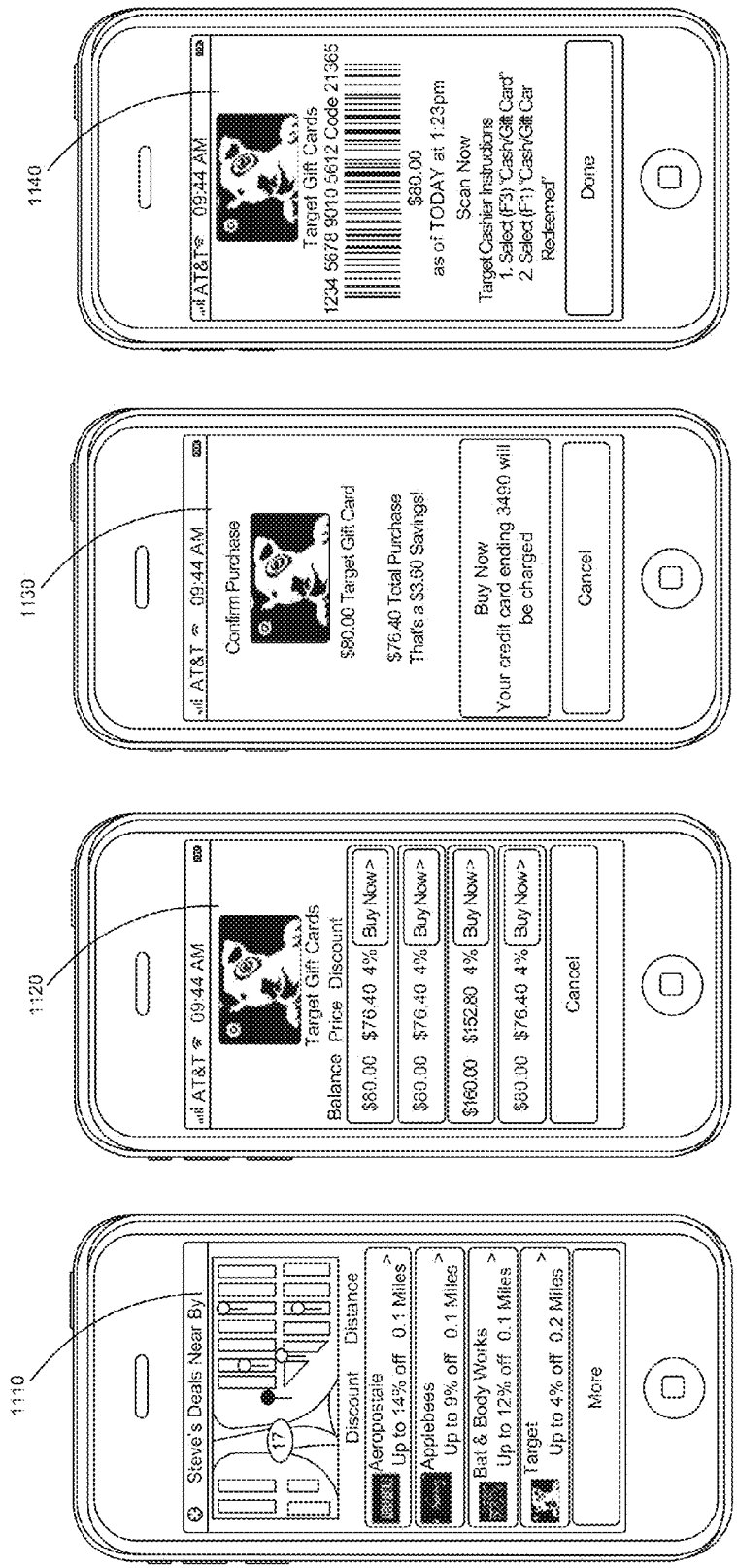
FIG. 11 is a diagram that depicts a series of displays that allow a user to find and access deals that are near the user, according to an embodiment.

FIG. 11 is a diagram that depicts a series of displays 1110-1140 that allow a user to find and access deals that are near the user, according to an embodiment. Display 1110 lists promotions (or deals) that are located near the user (or rather the user's device that executes a local digital wallet application). Display 1110 includes a map that indicates the current location of the user and the location of stores of merchants that provided the promotions. In other embodiments, the current location of the user is not shown on the map or the map is not shown at all.

Display 1110 may be shown to the user in response to an explicit instruction by the user to view promotions near the user. Alternatively, display 1110 may be shown to the user in response to a clickable notification (sent from exchange service 120) that promotions are available to the user.

Exchange service 120 leverages the promotions to offer gift cards (or other value-ascertainable items) that are redeemable at the same merchant(s) that are providing the promotions. In this way, the user is incentivized to purchase one or more of the offered discounted gift cards and make a purchase at the corresponding merchant(s) to take advantage of the discounted gift cards and the promotion.

In response to selection of one of the merchants where a promotion is available, display 1120 is shown to the user. Displays 1120-1140 are similar to displays 520, 530, and 550 of FIG. 5. In an alternative embodiment, the "deals nearby" do not refer to promotions by merchants that are located near the user. Instead, the "deals nearby" refer to value-ascertainable items (e.g., gift cards) that (1) are issued by merchants that have stores that are located near the current location of the user and (2) that are available for the user to purchase, i.e., through exchange service 120.

Gift Guarantee

In an embodiment, exchange service 120 allows a first user to gift a value-ascertainable item to a second user. However, in some situations, the second user may not want the gifted value-ascertainable item. Thus, exchange service 120 allows the second user to exchange the gifted value-ascertainable item for another value-ascertainable item. The exchanged-for item may be currently in the marketplace that exchange service 120 manages. Alternatively, the exchanged-for item may be an item, such as a new gift card, that exchange service 120 activates on behalf of a particular merchant.

Immediately before the gift is made, the gifted value-ascertainable item may be a registered item (i.e., in the first user's digital wallet). Alternatively, the gifted item may be in a marketplace managed by exchange service 120 and, thus, purchased by the first user from exchange service 120.

In an embodiment, to ensure that exchange service 120 does not lose money in case the second user desires to exchange the gifted item for another value-ascertainable item, the first user provides exchange service 120 an "exchange guarantee" fee. The fee may be, for example, a certain percentage of the value of the gifted value-ascertainable item. For example, user A desires to gift a $100 gift card issued by merchant M to user B, but is not sure user B wants a gift card from merchant A. User A pays a fee of $3 to allow user B to exchange the gift card for another gift card of the same $100 value. The other gift card may be limited to a certain list of merchants. Exchange service 120 sends, to the user B, a message that informs user B of the $100 gift card of merchant M and of the possibility that user B can exchange that $100 gift card for a $100 gift card redeemable at one or more other merchants for no cost. The cost of the exchange is paid by user A in the form of the exchange guarantee fee.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
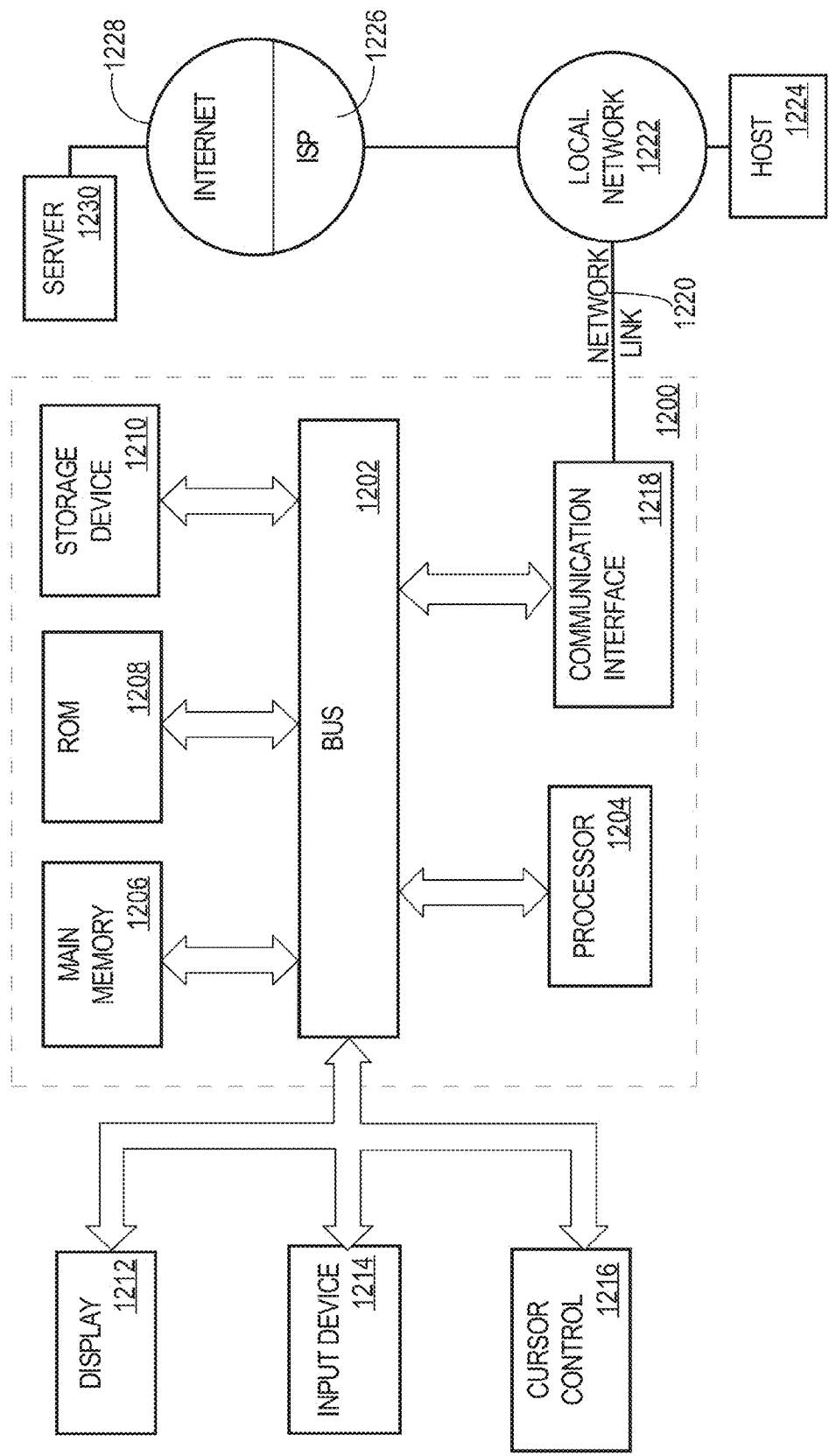
FIG. 12 is a block diagram that depicts a computer system upon which an embodiment of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method comprising:
storing, in a digital wallet of a first user, item identification data that identifies a first value-ascertainable item issued by a first merchant, owned by the first user;
receiving, over a network, exchange data that indicates a second value-ascertainable item issued by a second merchant different from the first merchant, to be exchanged for the first value-ascertainable item;
in response to receiving the exchange data, removing, from the digital wallet the item identification data, first item data that identifies the first value-ascertainable item and saving item identification data that identifies the second value-ascertainable item;
determining a current location of a device of the first user;
identifying a location of a store, of a merchant, that is associated with the second value ascertainable item within a certain distance of the current location;
causing information about the second value-ascertainable item to be displayed to the first user;
wherein the first merchant is incapable of redeeming the second value-ascertainable item and the second merchant is incapable of redeeming the first value-ascertainable item.

2. The method of claim 1, wherein:
the step of storing the identification data is performed by an exchange service;
the exchange service purchased the second value-ascertainable item from a second user that is different than the first user.

3. The method of claim 1, wherein the one of the first value-ascertainable item or the second value-ascertainable item is a closed-loop stored-value instrument and the other of the first value-ascertainable item or the second value-ascertainable item is a number of points from a reward or loyalty points program.

4. The method of claim 1, further comprising:
determining an offer value for the first value-ascertainable item;
sending the offer value for the first value-ascertainable item;
receiving acceptance data that indicates that the first user accepted the offer value;
in response to receiving the acceptance data, storing value data that associates a value with the first user;
sending account identification data that identifies an account of a merchant that is capable of redeeming the second value-ascertainable item.

5. The method of claim 4, wherein:
the first value-ascertainable item is a closed-loop stored-value instrument;
the method further comprising sending, over a second network, one or more requests to determine a balance of the closed-loop stored-value instrument;
determining the offer value comprises determining the offer value based on the balance obtained in response to sending the one or more requests.

6. The method of claim 4, further comprising, prior to sending the offer value:
  determining a market value of the first value-ascertainable item;
  wherein determining the offer value comprises determining the offer value based on the market value.

7. The method of claim 1, further comprising:
  in response to identifying the merchant, determining whether the digital wallet includes any value-ascertainable item issued by the merchant.

8. The method of claim 7, wherein identifying the merchant comprises:
  accessing the digital wallet to identify one or more merchants that issued one or more value-ascertainable items that are reflected in the digital wallet of the first user, and
  identifying the location of the store based on identification of the merchant.

9. The method of claim 7, wherein prior to receiving the exchange data the second value-ascertainable item is not owned by the first user, and is presented to the first user by an exchange service.

10. The method of claim 1, wherein the first value-ascertainable item is owned by the first user prior to receiving any information about the first value-ascertainable item.

11. The method of claim 1, further comprising, prior to receiving the first item data, purchasing the first value-ascertainable item from a second user that is different than the first user, wherein receiving the first item data comprises receiving purchase data that indicates that the first user desires to purchase the first value-ascertainable item from an exchange service that performed the purchasing step.

12. The method of claim 1, wherein:
  updating the item identification data to include the second item data is performed while the first user is in a store of a merchant that is capable of redeeming the second value-ascertainable item.

13. The method of claim 1, further comprising, sending, over the network, account identification data that includes (a) an account identifier of the second value-ascertainable item or (b) a bar code that is scannable by a bar code reader and that reflects the account identifier of the second value-ascertainable item.

14. One or more non-transitory media storing instructions which, when executed by one or more processors, cause:
  storing, in a digital wallet of a first user, item identification data that identifies a first value-ascertainable item issued by a first merchant, owned by the first user;
  receiving, over a network, exchange data that indicates a second value-ascertainable item issued by a second merchant different from the first merchant, to be exchanged for the first value-ascertainable item;
  in response to receiving the exchange data, removing, from the digital wallet the item identification data, first item data that identifies the first value-ascertainable item and saving item identification data that identifies the second value-ascertainable item;
  determining a current location of a device of the first user;
  identifying a location of a store, of a merchant, that is associated with the second value ascertainable item within a certain distance of the current location;
  causing information about the second value-ascertainable item to be displayed to the first user;
  wherein the first merchant is incapable of redeeming the second value-ascertainable item and the second merchant is incapable of redeeming the first value-ascertainable item.

15. The one or more non-transitory media of claim 14, wherein:
  storing the identification data is performed by an exchange service;
  the exchange service purchased the second value-ascertainable item from a second user that is different than the first user.

16. The one or more non-transitory media of claim 14, wherein the one of the first value-ascertainable item or the second value-ascertainable item is a closed-loop stored-value instrument and the other of the first value-ascertainable item or the second value-ascertainable item is a number of points from a reward or loyalty points program.

17. The one or more non-transitory media of claim 14, wherein the instructions, when executed by the one or more processors, further cause:
  determining an offer value for the first value-ascertainable item;
  sending the offer value for the first value-ascertainable item;
  receiving acceptance data that indicates that the first user accepted the offer value;
  in response to receiving the acceptance data, storing value data that associates a value with the first user;
  sending account identification data that identifies an account of a merchant that is capable of redeeming the second value-ascertainable item.

18. The one or more non-transitory media of claim 17, wherein:
  the first value-ascertainable item is a closed-loop stored-value instrument;
  the instructions, when executed by the one or more processors, further cause sending, over a second network, one or more requests to determine a balance of the closed-loop stored-value instrument;
  determining the offer value comprises determining the offer value based on the balance obtained in response to sending the one or more requests.

19. The one or more non-transitory media of claim 14, wherein the instructions, when executed by the one or more processors, further cause, prior to sending the offer value:
  determining a market value of the first value-ascertainable item;
  wherein determining the offer value comprises determining the offer value based on the market value.

20. The one or more non-transitory media of claim 14, wherein the instructions, when executed by the one or more processors, further cause:
  in response to identifying the merchant, determining whether any value-ascertainable item in the plurality of value-ascertainable items was issued by the merchant;
  determining that a value-ascertainable item in the plurality of value-ascertainable items was issued by the merchant;
  wherein the particular value-ascertainable item is the value-ascertainable item.

21. The one or more storage media of claim 20, wherein prior to receiving the exchange data the second value-ascertainable item is not owned by the first user, and is presented to the first user by an exchange service.

22. The one or more non-transitory media of claim 14, wherein the first value-ascertainable item is owned by the first user prior to receiving any information about the first value-ascertainable item.

23. The one or more non-transitory media of claim 14, wherein the instructions, when executed by the one or more processors, further cause, prior to receiving the first item data, purchasing the first value-ascertainable item from a second user that is different than the first user, wherein receiving the first item data comprises receiving purchase data that indicates that the first user desires to purchase the first value-ascertainable item from an exchange service that performed the purchasing step.

24. The one or more non-transitory media of claim 14, wherein:
  updating the item identification data to include the second item data is performed while the first user is in a store of a merchant that is capable of redeeming the second value-ascertainable item.

25. The one or more non-transitory media of claim 14, wherein the instructions, when executed by the one or more processors, further cause, sending, over the network, account identification data that includes (a) an account identifier of the second value-ascertainable item or (b) a bar code that is scannable by a bar code reader and that reflects the account identifier of the second value-ascertainable item.

* * * * *